United States Patent [19]

Ozechoski

[11] 3,856,994

[45] Dec. 24, 1974

[54] KEY TELEPHONE UNIT LINE CARD

[75] Inventor: Anthony T. Ozechoski, Erie, Pa.

[73] Assignee: Basic, Inc., Cleveland, Ohio

[22] Filed: July 13, 1973

[21] Appl. No.: 379,174

[52] U.S. Cl. ................ 179/99, 179/18 F, 179/81 R

[51] Int. Cl. ........................................... H04m 1/00

[58] Field of Search........ 179/99, 81 R, 81 A, 81 C, 179/84 R, 84 A, 84 L, 18 F, 18 FA

[56] References Cited

UNITED STATES PATENTS

| | | | |
|---|---|---|---|
| 3,558,830 | 1/1971 | Bender | 179/81 R |
| 3,748,403 | 7/1973 | Schartmann et al. | 179/99 |
| 3,764,752 | 10/1973 | Yachabach | 179/81 R |
| 3,766,325 | 10/1973 | Hatfield et al. | 179/99 |

*Primary Examiner*—Thomas A. Robinson
*Attorney, Agent, or Firm*—Donnelly, Maky, Renner & Otto

[57] ABSTRACT

A line card for use in a key telephone system with numerous telephone services provides for electrical isolation between the ring and tip lines and the control circuitry by using a photomodule and blocking capacitor. The control circuitry includes a variable time-out circuit having a plurality of selective resistors, a plurality of NOR gate logic circuits, and a plurality of relays on the card. A zener diode provides a regulated, durable, and surge resistant power supply for the line card, and a light emitting diode provides a positive and continuous indication at the line card of the energization thereof and the seizure of the telephone line.

21 Claims, 1 Drawing Figure

PATENTED DEC 24 1974 3,856,994
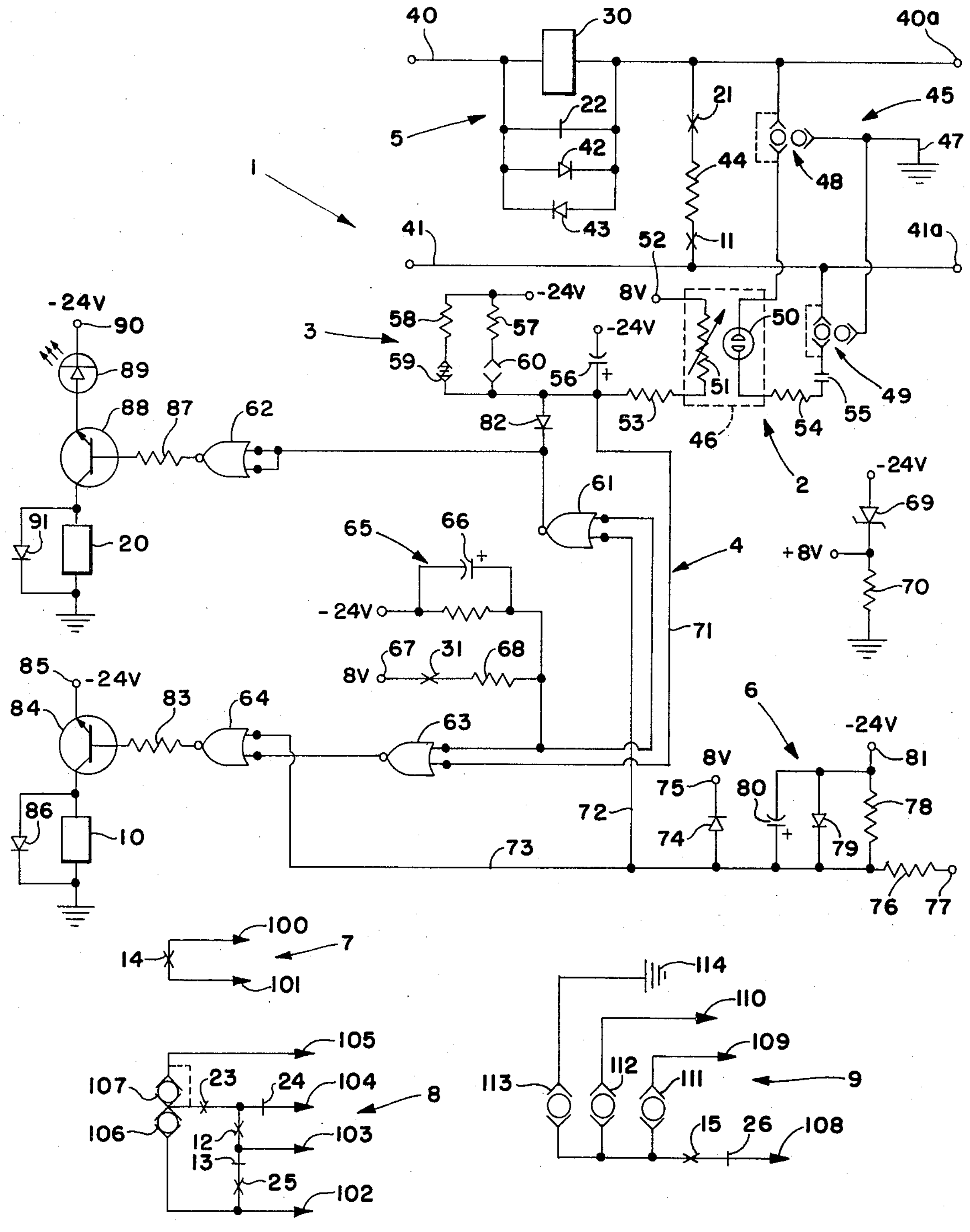

KEY TELEPHONE UNIT LINE CARD

BACKGROUND OF THE INVENTION

This invention relates to a line card for key telephone systems and more particularly to such a line card adaptable for use with a plurality of telephone services.

Some prior art line cards for use in key telephone systems have the disadvantage of being directly coupled to the ring and/or tip telephone lines without some electrical isolation, thus being subject to odd electrical phenomena such as noise, voltage spikes, lightning and the like, sometimes causing damage to the line card as well as effecting a false indication of an incoming call. Other prior art line cards require numerous complex circuits for providing the functions required in a key telephone system. Additionally, prior art line cards do not provide accurate time-out circuits nor durable and stable internal power supplies.

Key telephone systems for use by telephone customers permit the connection of several telephone units to one or more telephone circuits comprising conventional ring and tip lines. The function of a line card in such a key telephone system is to provide for line seizure when the telephone is in "off-hook" or hold conditions, to provide energization of an electromechanical or solid state interrupter circuit to power an audio signal circuit upon receiving an incoming call, and to provide visual signaling at the telephone unit at the occurrence of an incoming call or a telephone off-hook or hold condition.

SUMMARY OF THE INVENTION

Accordingly, it is a primary object of this invention to provide an economical line card that is efficient, reliable, long lasting, and adaptable in various easily adjusted configurations with controlled relays for use with a variety of telephone services.

A further object of the invention is to provide a line card that eliminates false ringing signals and indications thereof.

Another object of the invention is to provide a line card for energization by a ring signal produced on a telephone line between the ring and tip lines, ring and ground, or tip to ground, such line card including control circuitry electrically isolated from the telephone line.

An additional object of the invention is to provide a line card incorporating solid state logic circuitry for controlling operation of plural relays to effect and maintain line seizure and appropriate indications of ringing and/or line seizure conditions.

Still a further object of the invention is to provide a line card for use in a key telephone system which provides calling party control, line card circuit isolation, an accurate selectively variable time-out protection using solid state logic circuitry for minimum power requirements.

Still another object of the invention is to provide a line card that is adaptable for producing a plurality of visual and audio signals to indicate the condition of a telephone line.

Still an additional object of the invention is to provide a line card that provides effective continuous seizure of a telephone line when a telephone unit is placed in the hold condition.

Yet another object of the invention is to provide a regulated, durable, surge-resistant power supply for line cards.

These and other objects and advantages of the instant invention are achieved by using three electromechanical relays, four NOR gates coupled in a logic circuit, reverse poled diodes for polarity reversal of the ring and tip telephone lines, electromechanical and blocking capacitor line card isolation making the latter impervious to odd electrical phenomena such as noise, voltage spikes, lightning, etc., a light emitting diode to indicate continuously and positively that a line is seized and the line card is in use, a plurality of options for visual and audio signals, selectively variable time-out duration, and ring and tip line connections for receiving ring signals in either a bridge configuration across the ring and tip lines, a tip line to ground configuration, or a ring line to ground configuration, and a zener diode power supply.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawing:

The sole FIGURE is a schematic diagram partially in block form of a line card electric circuit for use in a key telephone system.

DESCRIPTION OF THE PREFERRED EMBODIMENT

Referring now to the drawing, a line card circuit generally indicated at 1 includes a plurality of circuit portions including an isolation circuit portion 2 for providing electrical isolation between the line card and the telephone lines to which it is connected and a selectively variable time-out circuit portion 3 coupled to the former for temporarily storing signals produced thereby. Thus, a periodic ring signal, for example, from the central telephone office, which signal generally has an "on" time of one or more seconds and an "off" time of one or more seconds, produces a corresponding periodic isolated signal in the isolation circuit portion 2 for temporary storage in the time-out circuit portion 3 and application to a logic circuit portion 4 of the line card circuit. A polarity responsive input circuit 5 receives the ring signal as well as normal line current and provides for passage thereof to operate the line card; and a temporary disconnect circuit portion 6 permits the receiving party to disconnect temporarily, normally called a flicker, without losing a seized line.

An interrupter circuit 7, visual signal circuit 8, and audio signal circuit 9 include a plurality of contacts for controlling energization of an electromechanical or solid state interrupter, a visual signal indicating device or lamp, and an audio indicating device such as a bell or buzzer in the telephone unit, not shown. Each of the contacts in the drawing is represented by an X across the appropriate wire to indicate that the contacts are normally open or by a line "|" across a wire to indicate that the contact is normally closed. Energization of the relay controlling a set of contacts will reverse the normal condition.

A first relay 10 is coupled for energization by the logic circuit portion 4 to operate respective contacts 11 through 15 for effecting energization of appropriate circuits 7, 8, 9, and a second relay 20 is also energized under the control of the logic circuit portion for operating a plurality of contacts 21 through 26 in such circuits. A calling party control relay 30 is coupled for operation of a contact 31 in the logic circuit portion 4 to effect a change of logic input signal to the latter.

The line card circuit 1 is coupled to receive a ring signal on at least one of the ring and tip lines 40, 41, which comprise the telephone line from the central telephone office and a telephone unit, not shown, may be coupled across such lines at terminals 40*a*, 41*a* when in off-hood condition, i.e. with the receiver off the hook. The calling party control relay 30 is connected in the ring line 40, and contacts 22 and oppositely poled diodes 42, 43 are coupled in parallel with such relay. A resistor 44, which has an impedance approximating that of a telephone unit, is connected to normally open contacts 11, 21, and such contacts are also connected to the ring and tip lines 40, 41.

A ring signal may be generated at the central telephone office between the ring and tip lines as a bridge signal, or between one of the ring or tip lines and ground depending on the telephone service. A variable connection circuit 45 for coupling a photomodule 46, forming a portion of the isolation circuit portion 2, provides for connecting the latter to the ring and tip lines 40, 41, for bridge ringing, or for either ring to ground or tip to ground 47 ringing. A shorting bar, not shown, may be used to make the appropriate connections at each of the terminals 48, 49 to effect proper circuit connection. The photomodule 46 includes a neon lamp 50 which upon receiving a ring signal emits light or other electromagnetic radiation and a photosensitive resistor 51 which is positioned to receive such light and to vary in resistance in response thereto. A voltage source is connected to a terminal 52 at one side of the photo-sensitive resistor 51, and a resistor 53 is connected to the other side thereof, such elements developing isolated signals in response to ring signals directed to the neon lamp 50. Additionally, a current limiting resistor 54 and a DC signal blocking capacitor 55 are coupled in series with the neon lamp 50 to limit the current thereto when the ring signals have terminated. The resistor 54 and capacitor 55 circuit has a time constant suitable for blocking any noise signal from effecting a light output from the lamp 50 causing a false ringing signal production by the line card 1; thus, any noise signal reaching the lamp will not be of adequate duration to effect a light output therefrom.

The time-out circuit portion 3 includes a storage capacitor 56 coupled to the resistor 53 for temporarily storing the isolated signals developed at the photosensitive resistor 51 in the photomodule 46. Several resistors 57, 58 may be selectively coupled to the storage capacitor 56 by shorting bars inserted at the terminals 59, 60 to discharge the storage capacitor at a rate determined by the magnitude of the resistor used. Thus, the duration for which an isolated signal is stored in the storage capacitor 56 may be determined by a connection inserting a proper resistor in circuit to effect an appropriate RC time constant time-out effect. The use of selective resistors in the time-out circuit enables an accurate selection of time-out duration.

The logic circuit portion 4 includes four NOR gate circuits 61 through 64, each having a pair of input terminals and a single output terminal. For convenience, the upper input terminal of each NOR gate will be referred to below as the first input terminal and the lower such terminal as the second input terminal. Such NOR gates produce a logic 1 output signal when both input terminals receive concurrent logic zero input signals, and a logic 0 output signal when either or both of the input terminals receives a logic 1 input signal. For convenience, the voltages applied to several terminals are indicated in the drawing as +8 and −24 volts representing respective logic 1 and logic 0 signals. Each of the NOR gate circuits 61 through 64, is preferably a complementary metal oxide substrate integrated circuit, which has a very low current drain per gate, a response time adequate for use in telephone service, a wide operating threshold making the system relatively immune to noise and adaptable for use having minimum voltage regulation. An advantage to such circuits is the approach thereof to the characteristics of an ideal switch having either zero or infinite impedance.

Several input circuits are coupled to the logic circuit portion 4 for applying logic input signals thereto, including a parallel RC network 65 coupled to receive a negative 24 volt signal, the capacitor 66 in such network providing a speed-up function. The network 65 normally applies a logic 0 (−24 volt) signal to the first input terminals to each of NOR gates 61, 63. The network 65 is coupled at terminal 67 to receive an 8 volt signal at the normally open contacts 31, which upon closure by the calling party control relay 30 couple such terminal 67 through a resistor 68 to change the aforementioned logic 0 signal to a logic 1 (+8 volt) signal.

A zener diode 69 and current limiting resistor 70 voltage regulating circuit is connected between the −24 volt telephone power line and the +24 volt telephone ground to provide suitable voltages, for example +8 volts and −24 volts, to voltage input terminals in the line card 1 circuitry marked with such voltage designations. The voltage regulating circuit is also coupled to provide power to the NOR gate logic circuit 4, for example, by a connection from the individual NOR gates to the 8 volt terminal of the former. The zener diode voltage regulating circuit is more durable and has a better surge capability than formerly used transistor and other line card power supply and voltage regulating circuits which usually are coupled to commercial power lines through a voltage dropping transformer.

A second input to the logic circuit portion 4 is applied from the time-out circuit portion 3 on a line 71 to the second input terminal of the NOR gate 63. A third input to the logic circuit portion 4 is applied on lines 72, 73 to the second input terminal of NOR gate 61 and to the first input terminal of NOR gate 64. The lines 72, 73 are coupled to a clamping circuit including a diode 74 and a terminal 75, which is connected to the 8 volt source, and to the telephone unit through the temporary disconnect circuit portion 6, resistor 76, and terminal 77. The latter terminal is connected to the telephone unit, not shown. The temporary disconnect circuit portion 6 includes a resistor 78, diode 79 and capacitor 80 coupled at a terminal 81 to a negative 24 volt source.

The output terminal from NOR gate 61 is coupled through a diode 82 to the time-out circuit portion 3 for discharging the storage capacitor 56 when such output terminal is at logic 0. The output terminal from NOR gate 64 is connected through a resistor 83 to the base of a transistor 84. The negative 24 volt source is coupled to the terminal 85 for supplying power to the transistor, which has its collector connected to the relay 10, and a reverse poled diode 86 is coupled across the relay to avoid transients in the circuit and damage to the relay and transistor when rapid switching occurs.

The output terminal from the NOR gate 62 is connected through a resistor 87 to the base of a transistor 88, which has its emitter connected through a light emitting diode 89 to a terminal 90 for receiving a negative 24 volt signal. The collector of the transistor 88 is connected to the relay 20 across which a reverse poled diode 91 is coupled for avoiding transients and damage to the relay and transistor when rapid switching occurs. The light emitting diode emits light when a current flow path is established between ground and the negative 24 volt source through the relay 20, transistor 88, and the light emitting diode.

Each of the arrows 100, 101, representing terminals or lines in the interrupter circuit 7, is connected to effect energization of the interrupter in the telephone cabinet to provide a ringing signal in the telephone unit. The visual signal circuit 8 has its terminal 102 coupled, for example, to a power source and terminals 103, 104, 105 selectively couplable to the telephone unit to provide, respectively, steady, flash and wink signals of indicating lamps therein. Two option terminals 106, 107 may be selectively connected by shorting bars to effect a steady or winking lamp visual signal for hold condition. The audio signal circuit 9 has its terminal 108 connected to the ringing circuit of the telephone unit from the telephone cabinet, which may be remotely located, and option terminals 109, 110 connected for providing respective steady ringing and interrupted ringing signals as controlled by power supplied by the interrupter and connections made by shorting bars at the option terminals 111, 112. A connection of the option terminals 113 by a shorting bar grounds the interrupter controlled ringing signal to the ground terminal 114, whereby with such connection the telephone unit may be rung only by another relay control, not shown.

When the telephone unit is in off-hook position the impedance thereof is connected across the ring and tip lines 40, 41 to effect seizure and retention of the telephone line. A logic 0 is produced at the lines 72 and 73, when the telephone is in on-hook condition since the terminal 77 is coupled to an open circuit, and a logic 1 is produced when the telephone unit is in off-hook position since the terminal 77 is coupled then to the +24 volt telephone ground. The telephone unit also preferably has a hold button, which when depressed puts a logic 0 at the lines 72, 73 and disconnects the telephone impedance from across the terminals **40*a*, 41*a*.**

OPERATION

Assume that the contacts 48, 49 are connected for bridge ringing, option terminals 107 are connected in the visual signal circuit 84 for wink hold and option terminals 112 are connected in the audio signal circuit 9 for interrupted ringing. When no ring signal appears on the ring and tip lines 40, 41 the lamp 50 in the photomodule 46 will not be illuminated, and the impedance of the photosensitive resistor 51 will be very large. Thus, a logic 0 signal will appear on the line 71 as the output from the time-out circuit portion 3, and neither of the relays 10, 20, or 30 will be energized provided the telephone unit remains in on-hook position. Should an odd electrical phenomenon occur, such as for example, lightning striking the telephone wires or the occurrence of a voltage spike, the lamp 50 will be energized for a brief instant to reduce the resistance of the photo-sensitive resistor 51 permitting a current to flow from the terminal 52 to the resistor 53 and the storage capacitor 56 in the time-out portion 3. The instantaneous voltage spike or the like thus causes a similar signal of like duration to appear at the positive terminal of the storage capacitor 56, which immediately conducts such signal to the negative 24 volt source connected to the negative side thereof.

When, however, a proper ring signal appears across the ring and tip lines 40, 41 bypassing the calling party control relay 30 through the closed contacts 22, lamp 50 in the photomodule 46 radiates light or other electromagnetic radiation for the duration of the "on" portion of the ring signal to produce a positive isolated signal of like duration at the positive terminal of the storage capacitor 56. This latter device stores the isolated signals representing a logic 1 during the "off" portion of the ring signals, recharging at the occurrence of the next "on" portion of the ring signal to compensate for any leakage. Should the ring signal be temporarily or permanently interrupted, the storage capacitor 56 will retain its charged polarity for a duration determined by the RC time constant of the storage capacitor and the resistor 57 or 58 coupled thereto.

After a proper ring signal has caused charging of the capacitor 56, a logic 1 signal appears on the line 71. A logic 0 is applied by the network 65 to the first input terminals of NOR gates 61, 63, and a logic zero is applied on the line 72, 73 since the telephone unit is in on-hook position. The output terminal from NOR gate 61 is, therefore, at logic 1, which effects production of a logic 0 at the output terminal of NOR gate 62 maintaining the transistor 88 in non-conductive state. The output terminal from the NOR gate 63 is logic 0, and the output terminal of NOR gate 64 is at logic 1 causing the transistor 84 to conduit. The current conducted through the transistor 84 energizes the relay 10, which changes the states of contacts 11 through 15 to the opposites of the states shown. Thus, the relay contacts shown as normally closed will be opened, and those shown as normally opened will be closed.

When the telephone receiver is picked up, the telephone is in off hook condition, and a logic 1 is transmitted on the lines 72, 73 to the respective NOR gates 61, 64. Thus, the NOR gate 61 produces a logic 0 at its output terminal, which effects discharge of the storage capacitor 56 and the production of a logic 1 at the output terminal of NOR gate 62. Thus, the transistor 88 conducts to energize the relay 20 and to effect radiation of light from the light emitting diode 89. The energized relay 20 effects operation of the contacts 21 through 26 to provide the appropriate visual signal and to eliminate the audio ringing signal at the telephone unit. Also, when the contacts 22 open, the battery current flowing through the ring and tip lines 40, 41 from the central telephone station flows through one of the diodes 42, 43 depending upon polarity and the small voltage drop across such diode effects energization of the calling party control relay 30 which closes the contacts 31 and places a logic 1 signal on the respective input terminals to the NOR gates 61, 63.

The logic 1 on the line 73 due to the off-hook condition also causes the output from NOR gate 64 to become logic 0, which causes transistor 84 to cease conduction and the relay 10 to de-energize. Thus, the contacts 14 in the interrupter circuit 7 open to de-energize the interrupter.

The purpose of the calling party control relay 30 is to permit the calling party to disconnect even when the receiving party retains the telephone in off-hook position. Thus, when the telephone unit is in off-hook condition, the relay 10 is de-energized; and should the calling party hang up, the calling party control relay 30 is de-energized, and the contacts 31 open to effect a logic 0 at the first input terminal of NOR gate 61. When the telephone unit goes to on-hook condition a logic 0 on the second input terminal to NOR gate 61 effects de-energization of the relay 20 and release of the line.

The temporary disconnect circuit portion 6 provides a time delay to prevent the generation of a logic 0 on the lines 72, 73 when the receiving party temporarily disconnects by placing his telephone in on-hook condition for a very short time.

A hold condition is achieved by pushing the hold button on the telephone unit to generate a logic 0 on the lines 72, 73, which signal is applied to the appropriate terminals of the NOR gates 61, 64. Thus, the NOR gate 64 produces a logic 1 output, which effects conduction in the transistor 84 to energize the relay 10. Both relays 10 and 20 are now energized, and the contacts 11 and 21 are both closed to place the resistor 44 across the ring and tip lines 40, 41 to hold the lines even when the telephone unit goes to on-hook condition. Of course, when the telephone unit again goes to off-hook condition, a logic 1 is produced on lines 72, 73, which effects de-energization of the relay 10 and the resistor 44 is out of the circuit.

When calling out, the telephone unit is placed in off-hook condition, which places the telephone impedance across the terminals 40*a*, 40*b* of the ring and tip lines 40, 41 and produces a logic 1 signal on the lines 72, 73 to the NOR gates 61, 64. Thus, the output signals from both NOR gates 61, 64 are logic 0, and the NOR gate 62 produces a logic 1 output to effect conduction in the transistor 88 energizing the relay 20 and the light emitting diode 89. The output from NOR gate 64 is logic 0, which assures that the transistor 84 will not conduct. The energization of the relay 20 changes the normal states of the contacts 21 through 26; and an appropriate visual signal is produced and a circuit connection with the ring and tip lines is made.

It should now be seen that above described line card circuit provides for efficient, accurate, and reliable operation of a telephone unit in a key telephone system. Preferably all the elements of the line card circuit 1 are located on a single circuit board or card with part of the circuit being printed thereon and appropriate contactors for coupling to respective circuits in the remotely located key telephone system cabinet. The light emitting diode, which is a low power device provides a constant and immediate "in use" indication at the line card, and the three relays 10, 20, 30 and plural sets of option terminals provide for compatibility with numerous telephone services.

The embodiments of the invention in which an exclusive property or privilege is claimed are defined as follows:

1. A circuit for use in a key telephone system having a line capable of being in seized and unseized conditions, such line including input conductors on which periodic ring signals occur, comprising means for coupling said circuit to at least one of said input conductors to receive said ring signals, said means for coupling including means electrically isolating said circuit from said at least one of said input conductors for producing isolated signals in response to said ring signals and capacitive means for blocking DC signals on said input conductors from said circuit precluding false production of such isolated signals from noise, extraneous signals and the like on such input conductors, means coupled to said means for coupling for temporarily storing said isolated signals as stored isolated signals, means including selective resistor means for varying the duration for which said stored isolated signals are temporarily stored, logic circuit means coupled to said means for temporarily storing and responsive to said seized and unseized conditions of said line and to said stored isolated signals for producing logic output signals, said logic circuit means including a plurality of NOR gate circuits, and means responsive to said logic output signals for effecting indications of occurrence of said ring signals and of said seized and unseized conditions of said line.

2. A circuit for use in a key telephone system having a line capable of being in seized and unseized conditions as set forth in claim 1, wherein said means for coupling comprises means for producing electromagnetic radiation in response to receipt of said ring signals, and said means for producing comprises means responsive to said electromagnetic energy for producing said isolated signals.

3. A circuit for use in a key telephone system having a line capable of being in seized and unseized condition as set forth in claim 2, wherein said means for producing electromagnetic energy comprises a lamp means for producing light energy and said capacitive means for blocking blocks DC signals from said lamp.

4. A circuit for use in a key telephone system having a line capable of being in seized and unseized conditions as set forth in claim 3, said ring signals being periodic, having an on time and an off time, and wherein said capacitive means for blocking DC signals blocks the same from said lamp when said ring signals do not occur.

5. A circuit for use in a key telephone system having a line capable of being in seized and unseized conditions as set forth in claim 1, wherein said means for temporarily storing comprises a capacitor means for storing said isolated signals and said selective resistor means is coupled for varying the rate of discharge of said capacitor means.

6. A circuit for use in a key telephone system having a line capable of being in seized and unseized conditions as set forth in claim 5, said logic circuit means being directly coupled to said capacitor means, and at least one of said NOR gate circuits being coupled for selectively discharging said capacitor means.

7. A circuit for use in a key telephone system having a line capable of being in seized and unseized conditions as set forth in claim 1, wherein said means responsive to said logic output signals comprises first and second relay means for operating a plurality of contacts to effect said indication, and first and second transistor means coupled for respectively energizing said first and second relay means in response to said logic output signals.

8. A circuit for use in a key telephone system having a line capable of being in seized and unseized conditions as set forth in claim 7, one of said relay means being energized by said logic circuit means and said transistor means when said line is in the seized condition, and further comprising light emitting diode means coupled to the latter transistor means for indicating when the latter relay means is energized and means for delaying an indication of said logic circuit means of termination of a seized condition, whereby the existence of a brief unseized condition does not effect a change in said logic circuit means.

9. A circuit for use in a key telephone system having a line capable of being in seized and unseized conditions as set forth in claim 7, further comprising further relay means coupled in at least one of said input conductors for energization thereby in response to energization of one of said first and second relay means for effecting a change in at least one input signal to said logic circuit means.

10. A circuit for use in a key telephone system having a line capable of being in seized and unseized conditions as set forth in claim 9, said plurality of contacts being coupled for selectively energizing an interrupter circuit and audio and visual signal producing circuits in response to the energized and de-energized states of said first and second relay means.

11. A circuit for use in a key telephone system having a line capable of being in seized and unseized conditions as set forth in claim 9, further comprising hold resistor means for maintaining said line in seized condition upon energization of both of said first and second relay means.

12. A circuit as set forth in claim 1, said NOR gate circuits comprising complementary metal oxide substrate integrated circuits, and zener diode means and current limiting means coupled for providing regulated input power to said NOR gate circuits.

13. A line card for use in a key telephone system having ring and tip lines on which periodic ring signals occur, comprising an isolation circuit for coupling said line card to at least one of said ring and tip lines while maintaining electric isolation therebetween, a time-out circuit including a capacitor storage means coupled to said isolation circuit for storing isolated signals produced by the latter in response to a received ring signal, and selective resistor means coupled to each other at a common connection and also being individually connectable to said capacitor storage means for discharging the latter, whereby said capacitor storage means effects production of continuous stored isolated signals in response to the periodically varying isolated signals produced by said isolation circuit in response to said periodic ring signals, logic circuit means coupled to said capacitor storage means for producing logic output signals in response to the occurrence of said stored isolated signals and to signals indicative of seized and unseized conditions of said ring and tip lines, said logic circuit means including a plurality of NOR gate circuits, each having respective input terminals and output terminals, at least one of said input terminals being coupled for receipt of said continuous stored isolated signal, and at least another one of said input terminals being coupled for receipt of said signals indicative of said seized and unseized conditions, and the output terminals from at least two of said NOR gate circuits being coupled to produce logic output signals, and first and second relay means responsive to said logic output signals coupled for operating contact elements to indicate occurrence of said ring signals and seized and unseized conditions of said ring and tip lines, at least one of said relay means being coupled for energization of a further relay means coupled in one of said ring and tip lines, said further relay means being coupled for operating contact elements to effect change of at least one input signal to at least one of said NOR gate circuits.

14. A circuit for use in a key telephone system having a line capable of being in seized and unseized conditions as set forth in claim 13, further comprising means responsive to the polarity of said ring and tip lines at said further relay means for providing an energization voltage therefor.

15. A circuit for use in a key telephone system having a line capable of being in seized and unseized conditions as set forth in claim 13, further comprising first and second transistor means coupled to said first and second relay means for controlling current through the latter upon production of respective logic output signals.

16. A circuit for use in a key telephone system having a line capable of being in seized and unseized conditions as set forth in claim 15, further comprising a light emitting diode coupled to one of said transistors for indicating current flow to the relay means coupled thereto.

17. A line card for use in a key telephone system having ring and tip input conductors and a telephone unit for connection across said input conductors, such telephone unit having a hold circuit, said line card comprising an isolation circuit coupled to said ring and tip input conductors for producing in response to a received periodic ring signal a periodic isolated signal, said isolation circuit including capacitive means for blocking DC signals precluding false production of such periodic isolated signal from noise, extraneous signals and the like on such input conductors, means for storing said periodic isolated signal to produce a stored isolated signal upon the continued occurrence of said periodic ring and isolated signals, a logic circuit comprising a plurality of NOR gate circuits, each having respective input and output terminals, said means for storing being coupled to one input terminal of a first one of said NOR gate circuits, an input circuit for normally producing a first logic signal to the second input terminal of said first NOR gate circuit and to a first input terminal of a second NOR gate circuit, the output terminal of said first NOR gate circuit being coupled to a first input terminal of a third NOR gate circuit, and the second input terminal to said third NOR gate circuit being connected to receive a logic input signal indicative of the connection of said telephone unit across said input conductors or energization of said hold circuit, the latter logic input signal being coupled to the second input terminal of said second NOR gate circuit, said second NOR gate circuit output terminal being connected to the first and second input terminals of a fourth NOR gate circuit and for selectively discharging said means for storing, the output terminals from said third and fourth NOR gate circuits being coupled to respective first and second transistors for controlling current flow therethrough, said first and second transistors being connected to first and second relay means for selectively controlling contact elements to effect production of signals indicative of occurrence of said ring signals, occurrence of said connection of said telephone unit across said input conductors, or occurrence of energization of said hold circuit.

18. A line card as set forth in claim 17, further comprising further relay means coupled in one of said ring and tip lines for energization thereby in response to energization of one of said first and second relay means, said further relay means being coupled for controlling ssid input circuit to effect change in said first logic signal.

19. A line card as set forth in claim 18, further comprising light emitting diode means coupled to one of said transistor means for indicating current flow through at least one of said first and second relay means indicative of the connection of said telephone unit across said input conductor, whereby operation and energization of said line card is indicated by emission of light from said light emitting diode.

20. A line card for key telephone systems, such line card including logic circuitry responsive to a ring signal on a telephone line and to the condition of a telephone unit for effecting selective energization of relays to provide for line seizure and for appropriate signal indications of ring signal, line seizure, and hold conditions, the improvement comprising, said logic circuitry including complementary metal oxide substrate integrated circuit logic gates, and zener diode means and current limiting means coupled for providing regulated input power to said logic gates.

21. A line card for key telephone systems as set forth in claim 20, wherein said zener diode means and said current limiting means are connected in series circuit between an input power supply and relative ground potential.

* * * * *